United States Patent
Sekiya

(10) Patent No.: US 12,525,901 B2
(45) Date of Patent: Jan. 13, 2026

(54) IN-VEHICLE CONTROL DEVICE AND CONTROL METHOD FOR IN-VEHICLE CONTROL DEVICE

(71) Applicant: Hitachi Astemo, Ltd., Hitachinaka (JP)

(72) Inventor: Masashi Sekiya, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 265 days.

(21) Appl. No.: 18/559,700

(22) PCT Filed: Mar. 4, 2022

(86) PCT No.: PCT/JP2022/009531
§ 371 (c)(1),
(2) Date: Nov. 8, 2023

(87) PCT Pub. No.: WO2022/270021
PCT Pub. Date: Dec. 29, 2022

(65) Prior Publication Data
US 2024/0235436 A1    Jul. 11, 2024

(30) Foreign Application Priority Data
Jun. 21, 2021  (JP) .................................. 2021-102405

(51) Int. Cl.
*H02P 5/46* (2006.01)
(52) U.S. Cl.
CPC ..................................... *H02P 5/46* (2013.01)
(58) Field of Classification Search
CPC ......... B60K 6/22; H02P 6/085; H02P 7/2805; H02P 7/00; H02P 7/04; H02P 29/68;
(Continued)

(56) References Cited

U.S. PATENT DOCUMENTS

2013/0320677 A1* 12/2013 Yamada ............... B60K 17/356
318/45

FOREIGN PATENT DOCUMENTS

| JP | 9-331696 A | 12/1997 |
| JP | 2010-288420 A | 12/2010 |

(Continued)

OTHER PUBLICATIONS

International Search Report (PCT/ISA/210) issued in PCT Application No. PCT/JP2022/009531 dated May 10, 2022 with English translation (4 pages).

(Continued)

*Primary Examiner* — Antony M Paul
(74) *Attorney, Agent, or Firm* — Crowell & Moring LLP

(57) ABSTRACT

Provided is a highly reliable in-vehicle control device that controls driving of a plurality of loads, the in-vehicle control device being capable of suppressing heat generation caused by a ripple current of an electronic component constituting the in-vehicle control device. The in-vehicle control device includes: a plurality of load drive circuits; a microcontroller that transmits control signals to the plurality of load drive circuits; a determination unit that determines whether OFF timings of the control signals transmitted to the plurality of load drive circuits, respectively, match; a time change unit that changes the OFF timings based on a determination result of the determination unit, so that the OFF timings do not match; a control unit that sets load drive information from drive states of loads and corrects the set load drive information based on a change result of the time change unit; and a waveform generation unit that generates control signals to be transmitted to the plurality of load drive circuits based on the load drive information corrected by the control unit.

15 Claims, 13 Drawing Sheets

(58) Field of Classification Search
CPC .. B60L 3/12; H02K 11/33; H02K 7/14; G05B
19/042; B62D 5/046; H02J 2310/48;
B60W 10/04
See application file for complete search history.

(56) References Cited

FOREIGN PATENT DOCUMENTS

| | | |
|---|---|---|
| JP | 2012-29377 A | 2/2012 |
| JP | 2013-90504 A | 5/2013 |
| JP | 2015-202041 A | 11/2015 |
| JP | 2020-72607 A | 5/2020 |

OTHER PUBLICATIONS

Japanese-language Written Opinion (PCT/ISA/237) issued in PCT Application No. PCT/JP2022/009531 dated May 10, 2022 with English translation (5 pages).

* cited by examiner

| MOTOR DRIVER | PWM DRIVING FREQUENCY | Duty RATIO | DRIVER CURRENT |
|---|---|---|---|
| 1 | 1 kHz | 6% | SMALL |
| 2 | 1 kHz | 8% | MIDDLE |
| n | 1 kHz | 15% | LARGE |

| Priority | MOTOR DRIVER | PWM DRIVING FREQUENCY | Duty RATIO | DRIVER CURRENT |
|---|---|---|---|---|
| 1 | n | 1 kHz | 15% | LARGE |
| 2 | 2 | 1 kHz | 8% | MIDDLE |
| 3 | 1 | 1 kHz | 6% | SMALL |

| MOTOR DRIVER | PWM DRIVING FREQUENCY | Duty RATIO | MOTOR INFORMATION |
|---|---|---|---|
| 1 | 1 kHz | 6% | LOW PRIORITY |
| 2 | 1 kHz | 8% | MIDDLE PRIORITY |
| n | 1 kHz | 15% | HIGH PRIORITY |

| Priority | MOTOR DRIVER | PWM DRIVING FREQUENCY | Duty RATIO | MOTOR INFORMATION |
|---|---|---|---|---|
| 1 | n | 1 kHz | 15% | HIGH PRIORITY |
| 2 | 2 | 1 kHz | 8% | MIDDLE PRIORITY |
| 3 | 1 | 1 kHz | 6% | LOW PRIORITY |

IN-VEHICLE CONTROL DEVICE AND CONTROL METHOD FOR IN-VEHICLE CONTROL DEVICE

TECHNICAL FIELD

The present invention relates to a configuration of a control device that controls driving of loads and a control method thereof, and particularly relates to a technique that is effective when applied to an in-vehicle control device requiring high reliability.

BACKGROUND ART

Concerning an in-vehicle control device mounted on a vehicle, it has been known that, in a system configuration in which a plurality of loads are controlled by one in-vehicle control device, when ON timings of outputs of the loads match, an increase in heat generation leads to a reduction in lifespan of an electronic component constituting the in-vehicle control device.

Further, there is a demand for improving an automatic driving level in the automobile market, and a configuration of an in-vehicle control device and an operating time of a vehicle are changing. As the automatic driving level evolves in the future, the operating time of the vehicle will increase together with integration and high functionality of the in-vehicle control device, which shortens the lifespan of the electronic component. This problem becomes more important than ever.

As an example of a method of prolonging a lifespan of an electronic component, there has been known a method of smoothing a ripple current and suppressing heat generation by shifting ON timings of outputs of an in-vehicle control device as disclosed in PTL 1.

CITATION LIST

Patent Literature

PTL 1: JP H9-331696 A

SUMMARY OF INVENTION

Technical Problem

In PTL 1 described above, in order to suppress heat generation in an electronic component, a load control device smooths a ripple current flowing through the electronic component, by shifting an ON timing of an output voltage for each motor driver that is subject to pulse width modulation (PWM) control.

However, in the technique described in PTL 1, drive frequencies of all the motors are considered to be of the same value. In a case where the drive frequencies of the motors are different from each other, it is not possible to determine whether OFF timings of output voltages of the drivers match. Thus, it is difficult to sufficiently suppress the ripple current of the electronic component by matching the OFF timings of the output voltages of the drivers.

Therefore, an object of the present invention is to provide a highly reliable in-vehicle control device that controls driving of a plurality of loads, the in-vehicle control device being capable of suppressing heat generation caused by a ripple current of an electronic component constituting the in-vehicle control device, and a control method thereof.

Solution to Problem

In order to solve the aforementioned problem, an in-vehicle control device according to the present invention includes: a plurality of load drive circuits; a microcontroller that transmits control signals to the plurality of load drive circuits; a determination unit that determines whether OFF timings of the control signals transmitted to the plurality of load drive circuits, respectively, match; a time change unit that changes the OFF timings based on a determination result of the determination unit, so that the OFF timings do not match; a control unit that sets load drive information from drive states of loads and corrects the set load drive information based on a change result of the time change unit; and a waveform generation unit that generates control signals to be transmitted to the plurality of load drive circuits based on the load drive information corrected by the control unit.

In addition, a control method for an in-vehicle control device according to the present invention includes the steps of: (a) acquiring information on drive states of a plurality of loads connected to each other; (b) setting load drive information including ON/OFF timings of a plurality of load drive circuits for driving the plurality of loads, respectively, based on the information acquired in the step (a); (c) comparing OFF timings of the plurality of load drive circuits from output voltages of the plurality of load drive circuits, and determining whether the OFF timings match; (d) when it is determined in the step (c) that the OFF timings of the plurality of load drive circuits match, changing the OFF timing for any of the plurality of load drive circuits, and correcting the load drive information based on the changed OFF timing; and (e) generating control signals to be transmitted to the plurality of load drive circuits based on the load drive information corrected in the step (d).

Advantageous Effects of Invention

According to the present invention, it is possible to realize a highly reliable in-vehicle control device that controls driving of a plurality of loads, the in-vehicle control device being capable of suppressing heat generation caused by a ripple current of an electronic component constituting the in-vehicle control device, and a control method thereof.

As a result, the lifespan of the electronic component can be extended, thereby extending the lifespan of the in-vehicle control device and improving the reliability of the in-vehicle control device.

Other problems, configurations, and effects that are not described above will be apparent from the following description of embodiments.

DESCRIPTION OF EMBODIMENTS

Figure 1:
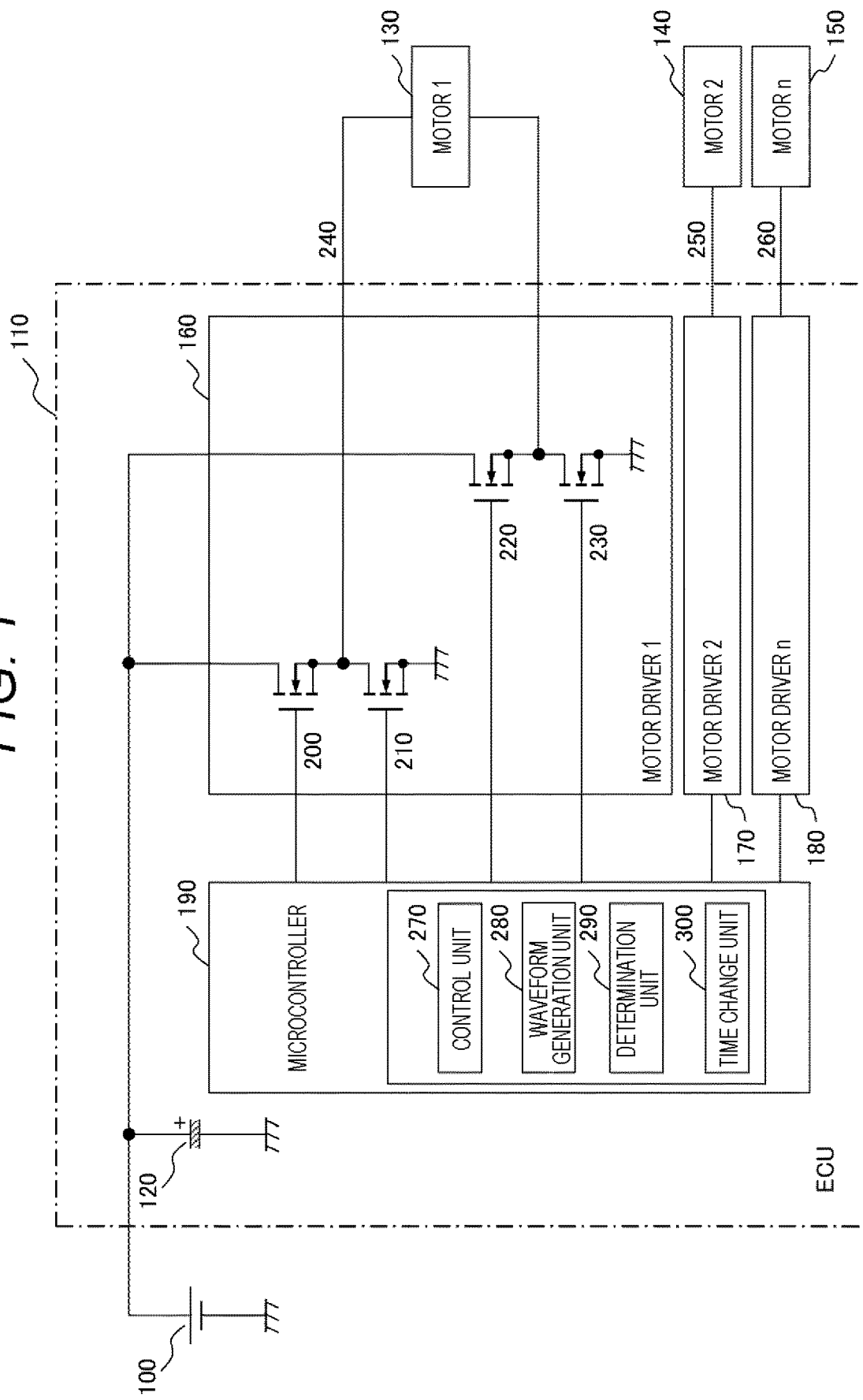
FIG. 1 is a diagram illustrating a basic configuration of an in-vehicle control device according to a first embodiment of the present invention.

Hereinafter, embodiments of the present invention will be described with reference to the drawings. In the drawings, the same components are denoted by the same reference signs, and the detailed description of overlapping portions will be omitted.

First Embodiment

An in-vehicle control device and a control method thereof according to a first embodiment of the present invention will be described with reference to FIGS. 1 to 6.

First, a basic configuration and an operation of an in-vehicle control device 110 to which the present invention is applied will be described with reference to FIGS. 1 and 2.

Figure 2:
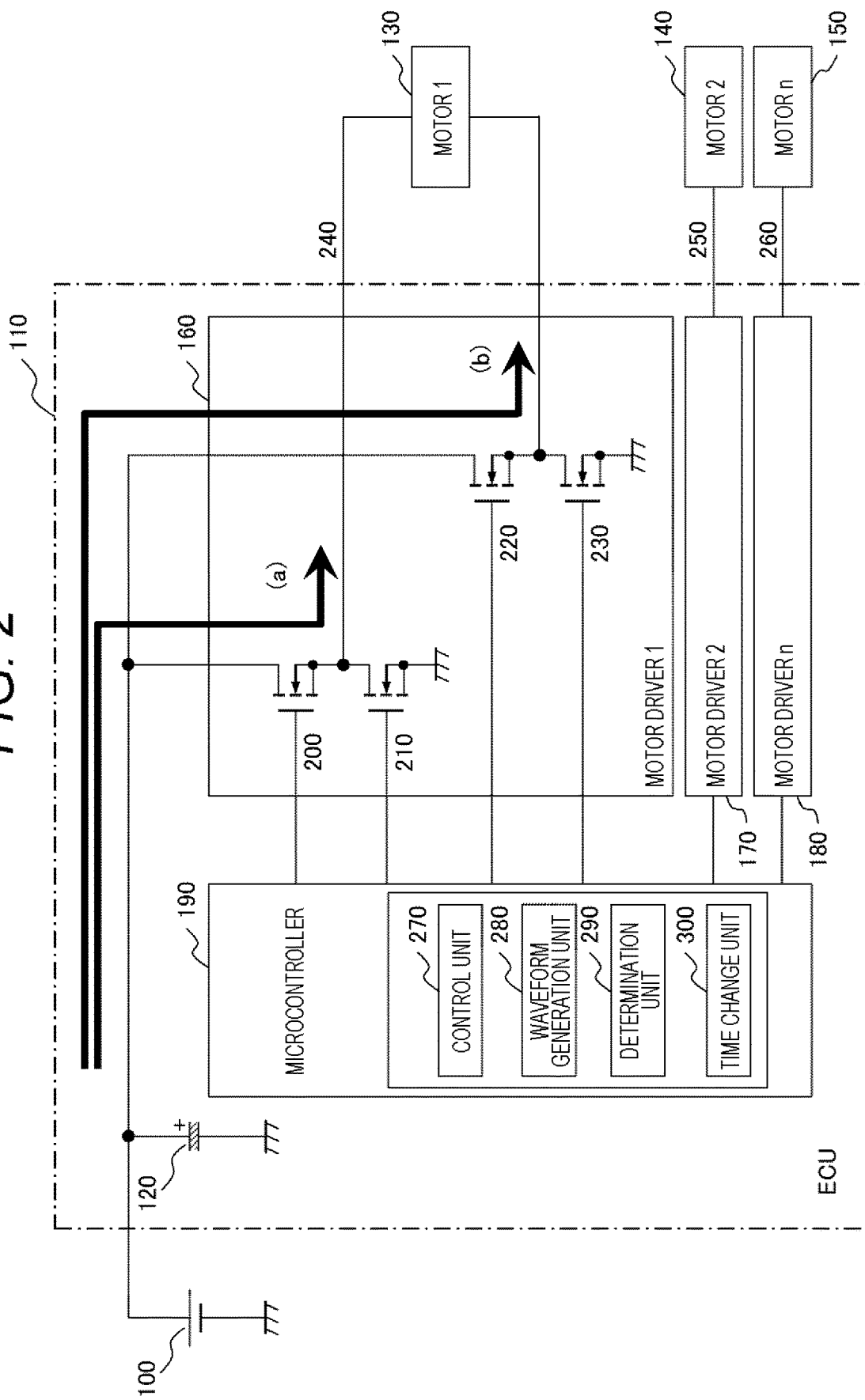
FIG. 2 is a diagram conceptually illustrating an operation of the in-vehicle control device of FIG. 1.

As illustrated in FIG. 1, the in-vehicle control device (also referred to as an electric control unit (ECU)) 110 to which the present invention is applied includes, as main components, an electronic component 120 such as an electrolytic capacitor for suppressing a fluctuation in current on a line of a power supply 100, motor drivers 160, 170, and 180 for driving a plurality of external motors 130, 140, and 150, and an integrated circuit device 190 such as a microcontroller for controlling the motor drivers 160, 170, and 180.

Each of the motor drivers 160, 170, and 180 includes switching elements 200, 210, 220, and 230 such as MOSFETs for driving the corresponding one of the external motors 130, 140, and 150.

The microcontroller 190 includes: a control unit 270 that sets motor drive information from states of the external motors 130, 140, and 150, sensors, and the like connected to the in-vehicle control device 110 as well as performing various calculations necessary for the operation of the in-vehicle control device 110; a waveform generation unit 280 that generates PWM waveforms based on an instruction from the control unit 270; a determination unit 290 that determines whether OFF timings of output voltages 240, 250, and 260 of the motor drivers match from the motor drive information set by the control unit 270; and a time change unit 300 that changes the OFF timings of the output voltages 240, 250, and 260 of the motor drivers before the control unit 270 instructs the waveform generation unit 280 to generate PWM waveforms.

The operation of the in-vehicle control device 110 of FIG. 1 will be described with reference to FIG. 2.

The PWM waveforms generated by the microcontroller 190 are input to the motor drivers 160, 170, and 180. Based on the input PWM waveforms, the switching elements included in the motor drivers 160, 170, and 180 start an ON/OFF operation. The ON/OFF switching operation of the switching elements changes the output voltages 240, 250, and 260 of the motor drivers to drive the external motors 130, 140, and 150.

For example, when the switching elements 200 and 230 are turned ON and the switching elements 210 and 220 are turned OFF, the current (a) flows from the power supply 100 toward the external motor 130, and the external motor 130 operates forward. On the other hand, when the switching elements 200 and 230 are turned OFF and the switching elements 210 and 220 are turned ON, the current (b) flows from the power supply 100 toward the motor 130, and the external motor 130 reversely external operates.

Next, a function of each unit of the in-vehicle control device 110 of FIG. 1 and a control method performed by the in-vehicle control device 110 will be described with reference to FIGS. 3 and 4.

The control unit 270 in the microcontroller 190 sets motor drive information such as drive start timings of the motor drivers 160, 170, and 180, a PWM drive cycle, and a duty ratio based on various states of the external motors 130, 140, and 150, sensors, and the like connected to the in-vehicle control device 110. The OFF timings of the output voltages 240, 250, and 260 of the motor drivers are determined from the set motor drive information.

Using a determination method of FIG. 5, which will be described later, the determination unit 290 compares the OFF timings of the output voltages 240, 250, and 260 of the motor drivers, and determines whether the OFF timings match.

The determination of the determination unit 290 as to whether the OFF timings match is comprehensively performed on all the motor drivers 160, 170, and 180, for example, using a method such as a search tree.

Note that the present invention is not limited to the search tree, and the effect of the present invention can be obtained even when the present invention is applied to an in-vehicle control device having a similar program configuration for comprehensively comparing whether the OFF timings of the motor drivers 160, 170, and 180 match.

When the determination unit 290 determines that the OFF timings match, the time change unit 300 changes the OFF timing of any of the motor drivers 160, 170, and 180 compared by the determination unit 290. The time change unit 300 reflects the changed OFF timing in the control unit 270.

The waveform generation unit 280 generates PWM waveforms based on the motor drive information (including the changed OFF timing) instructed from the control unit 270, and outputs the PWM waveforms to the motor drivers 160, 170, and 180.

Figure 4:
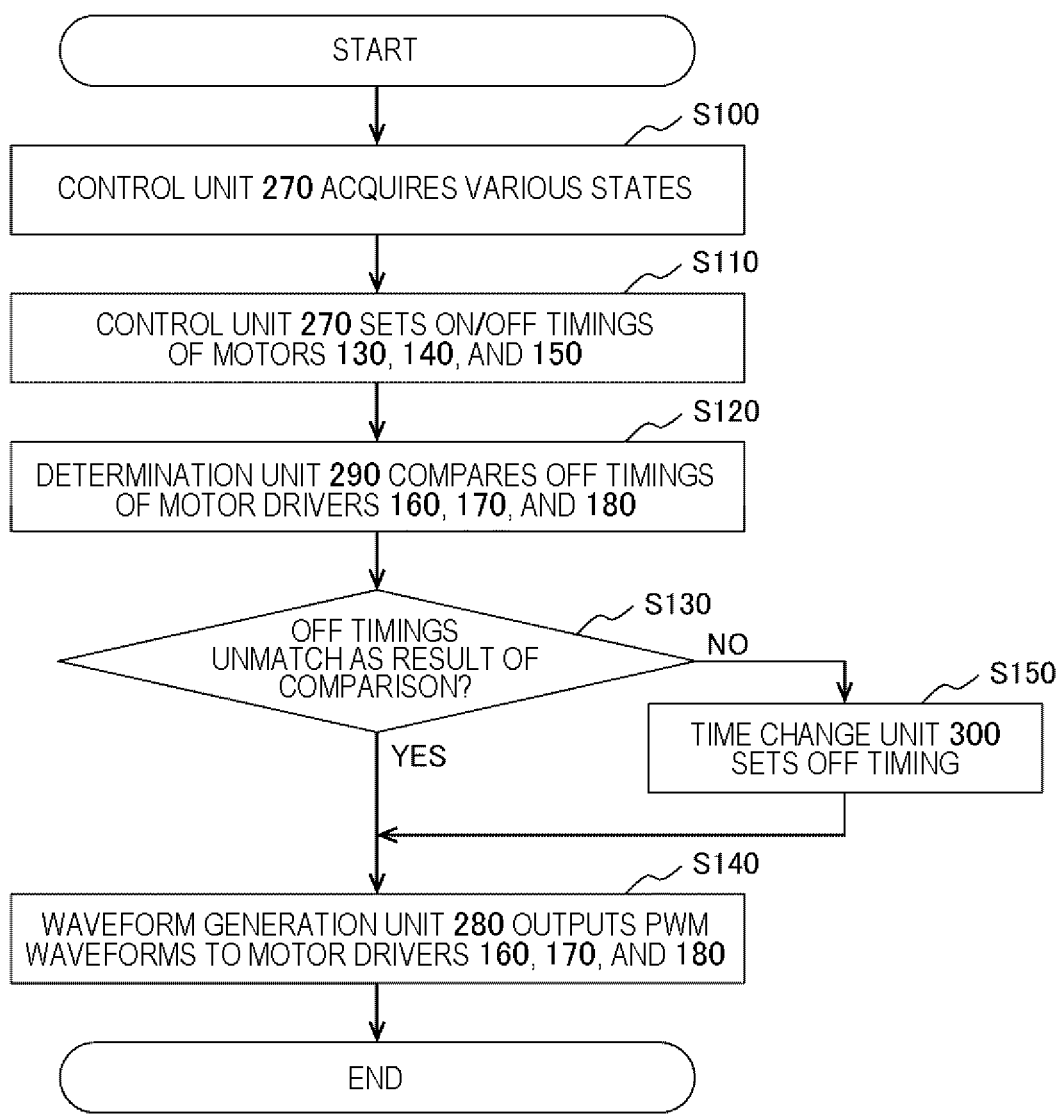
FIG. 4 is a flowchart illustrating a control method for the in-vehicle control device according to the first embodiment of the present invention.

The above-described control method is illustrated in a flowchart of FIG. 4.

First, in step S100, the control unit 270 acquires information regarding various states of the external motors 130, 140, and 150, sensors, and the like connected to the in-vehicle control device 110.

Next, in step S110, the control unit 270 sets motor drive information including ON/OFF timings of the external motors 130, 140, and 150 based on the information regarding various states acquired in the step S100.

Subsequently, in steps S120 and S130, the determination unit 290 compares OFF timings of the motor drivers 160, 170, and 180 from the output voltages 240, 250, and 260 of the motor drivers, and determines whether the OFF timings match.

When the determination unit 290 determines that the OFF timings of the motor drivers 160, 170, and 180 unmatch (YES), the process proceeds to step S140, and the waveform generation unit 280 generates PWM waveforms and outputs the PWM waveforms to the motor drivers 160, 170, and 180. Then, the process ends.

On the other hand, when the determination unit 290 determines that the OFF timings of the motor drivers 160, 170, and 180 match (NO), the process proceeds to step S150, and the time change unit 300 changes the OFF timing for any of the motor drivers 160, 170, and 180 compared by the determination unit 290, and reflects the changed OFF timing in the control unit 270.

Thereafter, the process proceeds to step S140, and the waveform generation unit 280 generates PWM waveforms based on the OFF timing changed by the time change unit 300, and outputs the PWM waveforms to the motor drivers 160, 170, and 180. Then, the process ends.

Taking a case where there are two motor drivers as an example, a method of determining whether the OFF timings of the output voltages 240 and 250 of the motor drivers 160 and 170 match will be described with reference to FIGS. 5 and 6.

Figure 5:
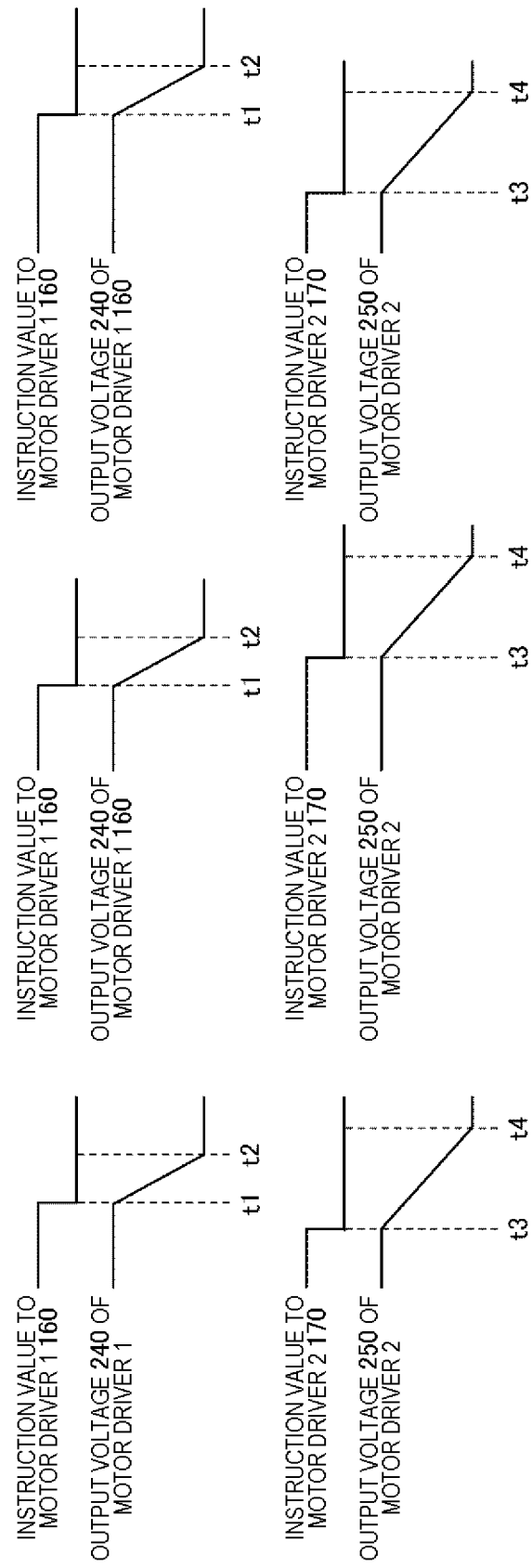
FIG. 5 is a diagram illustrating a condition for determining that OFF timings of output voltages of motor drivers match according to the present invention.

With respect to PWM waveform output instruction values from the waveform generation unit 280 to the motor drivers 160 and 170, the output voltages 240 and 250 of the motor drivers have transient response waveforms as illustrated in FIG. 5.

Figure 12:
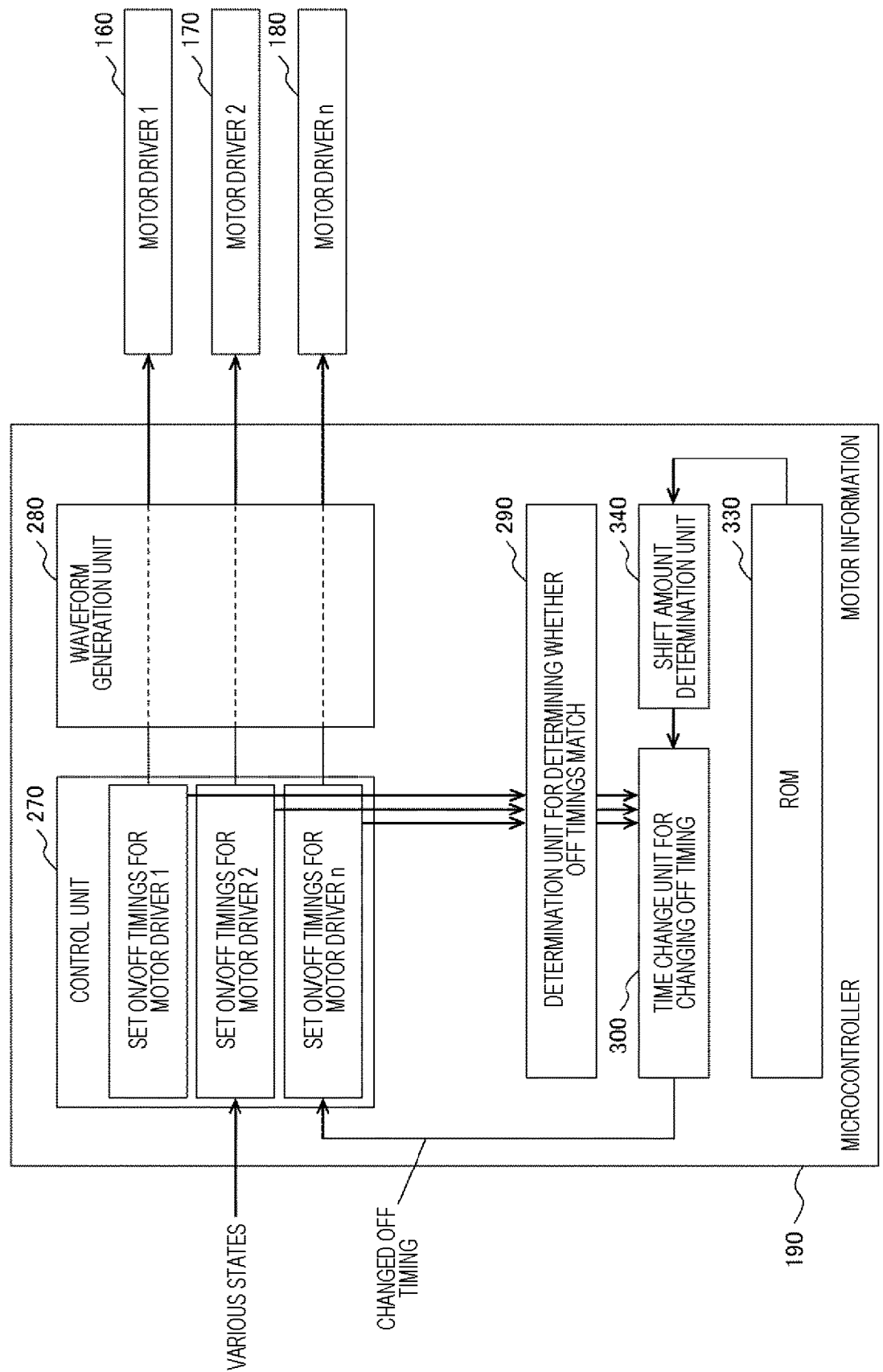
FIG. 12 is a functional block diagram of an in-vehicle control device according to a fifth embodiment of the present invention.

A transient response time is determined by a slew rate of the switching element (each of the switching elements 200, 210, 220, and 230 in the motor driver 160) included in each of the motor drivers 160 and 170. The slew rate information of the switching elements 200, 210, 220, and 230 can be referred to by the determination unit 290, for example, by being stored in a storage element 330 such as a read only memory (ROM), which will be described later in a fourth embodiment (FIG. 10) or a fifth embodiment (FIG. 12).

When transient response start times of the output voltages 240 and 250 of the motor driver 1 (160) and the motor driver 2 (170) are denoted by t1 and t3, transient response end times t2 and t4 are expressed as follows.

$$t2=t1+(\text{slew rate times of the switching elements 200, 210, 220, and 230 of the motor driver 1 (160)})$$

$$t4=t3+(\text{slew rate times of the switching elements of the motor driver 2 (170)})$$

As illustrated in FIG. 5, the determination unit 290 determines that the OFF timings of the motor driver 1 (160) and the motor driver 2 (170) match when t1-t3≥0 and t1-t4≤0 or t2-t4≤0 and t2-t3≥0 are satisfied as conditions including a state in which the transient response start times t1 and t3 and the transient response end times t2 and t4 of the output voltages 240 and 250 of the motor driver 1 (160) and the motor driver 2 (170) completely match.

Figure 6:
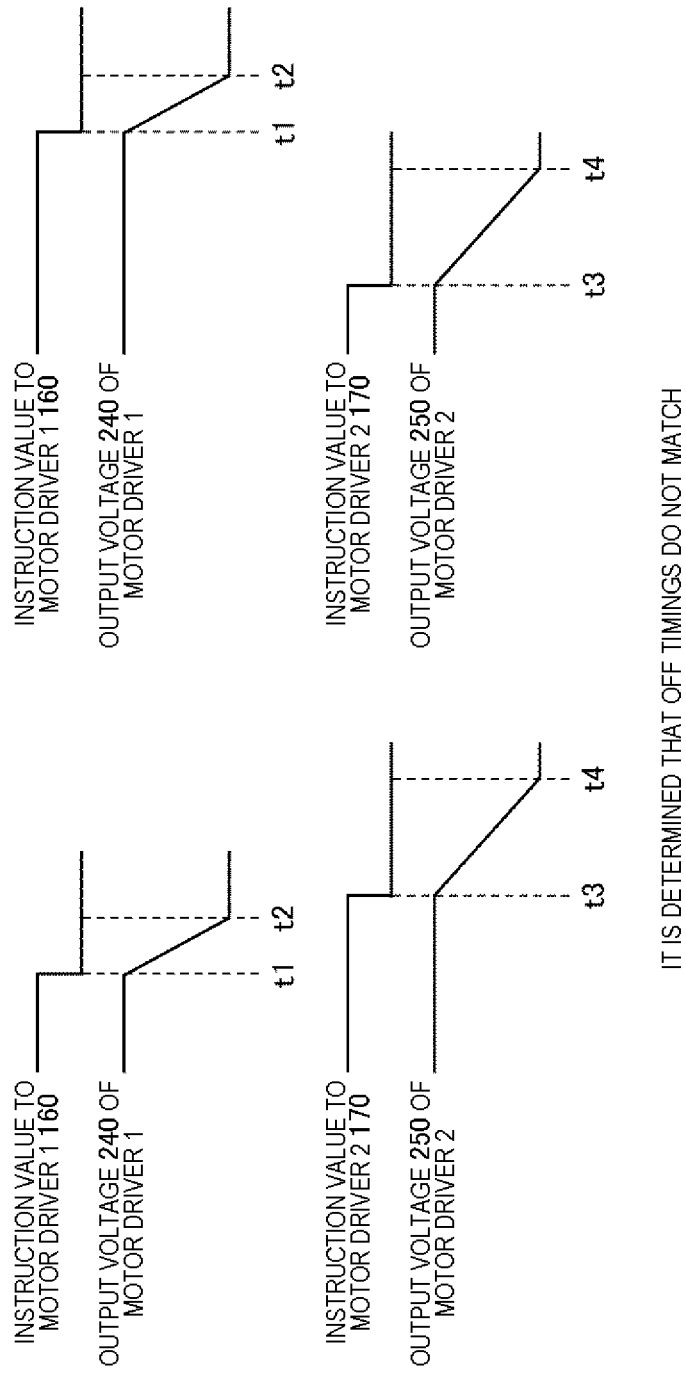
FIG. 6 is a diagram illustrating a condition for determining that OFF timings of output voltages of motor drivers do not match according to the present invention.

As illustrated in FIG. 6, the determination unit 290 determines that the OFF timings of the motor driver 1 (160) and the motor driver 2 (170) do not match when the conditions illustrated in FIG. 5 are not satisfied.

As described above, the in-vehicle control device 110 according to the present embodiment includes: a plurality of load drive circuits (motor drivers 160, 170, and 180); a microcontroller 190 that transmits control signals to the plurality of load drive circuits (motor drivers 160, 170, and 180); a determination unit 290 that determines whether OFF timings of the control signals transmitted to the plurality of load drive circuits (motor drivers 160, 170, and 180), respectively, match; a time change unit 300 that changes the OFF timings based on a determination result of the determination unit 290, so that the OFF timings do not match; a control unit 270 that sets load drive information from drive states of loads and corrects the set load drive information based on a change result of the time change unit 300; and a waveform generation unit 280 that generates control signals to be transmitted to the plurality of load drive circuits (motor drivers 160, 170, and 180) based on the load drive information corrected by the control unit 270.

The determination unit 290 determines that the OFF timings match, when fall transient response times of the plurality of load drive circuits (motor drivers 160, 170, and 180) overlap each other.

The in-vehicle control device 110 and the control method thereof according to the present embodiment is advantageous in that, by preventing the OFF timings of the output voltages 240, 250, and 260 of the motor drivers 160, 170, and 180 from matching each other, it is possible to smooth a ripple current of the electronic component 120 such as an electrolytic capacitor and suppress heat generation.

Second Embodiment

Figure 7:
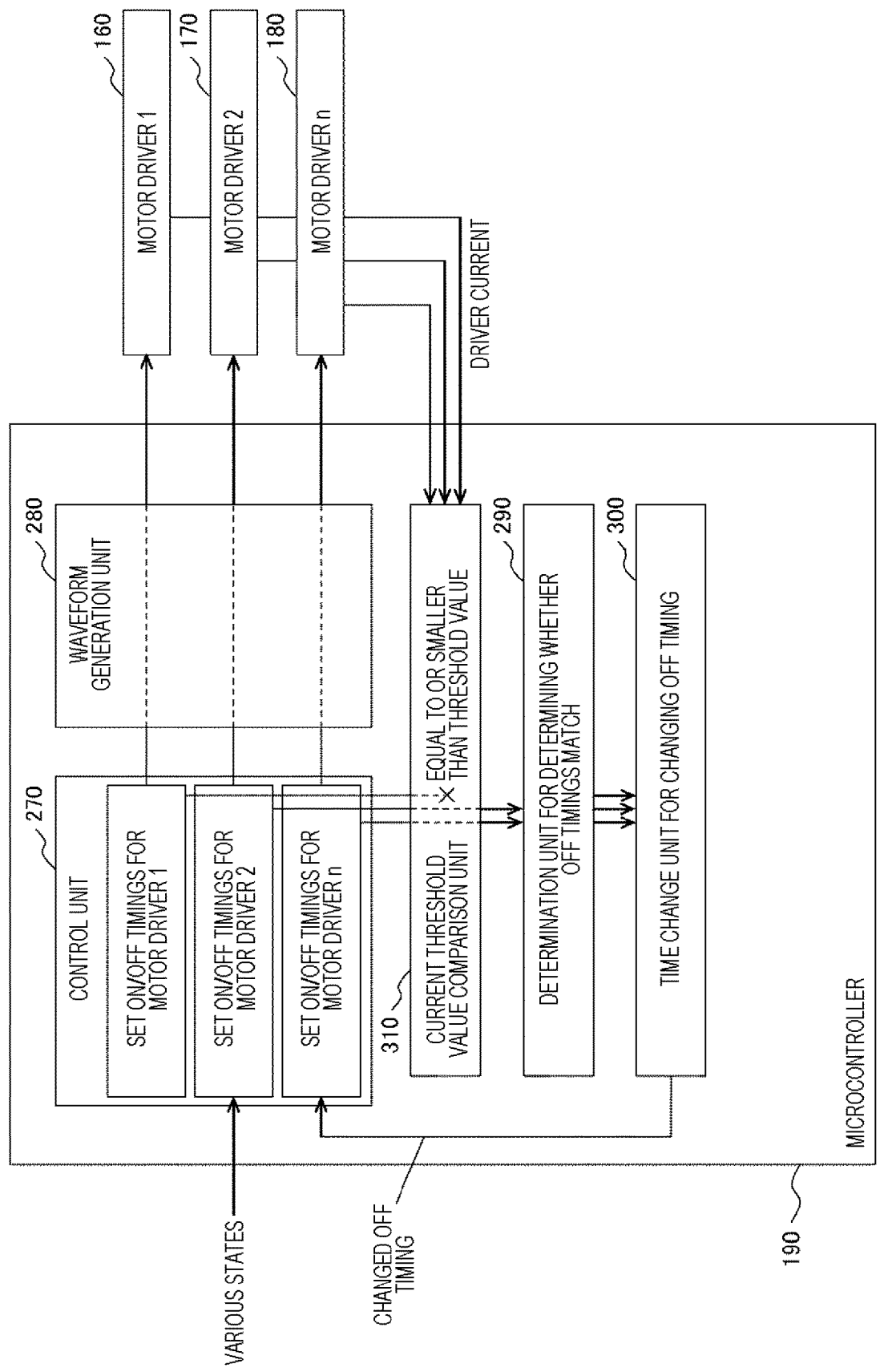
FIG. 7 is a functional block diagram of an in-vehicle control device according to a second embodiment of the present invention.

An in-vehicle control device and a control method thereof according to a second embodiment of the present invention will be described with reference to FIG. 7. FIG. 7 is a functional block diagram of an in-vehicle control device 110 according to the present embodiment, which is a modification of the first embodiment (FIG. 3). In FIG. 7, the power supply 100 and the electrolytic capacitor 120 are omitted.

Figure 3:
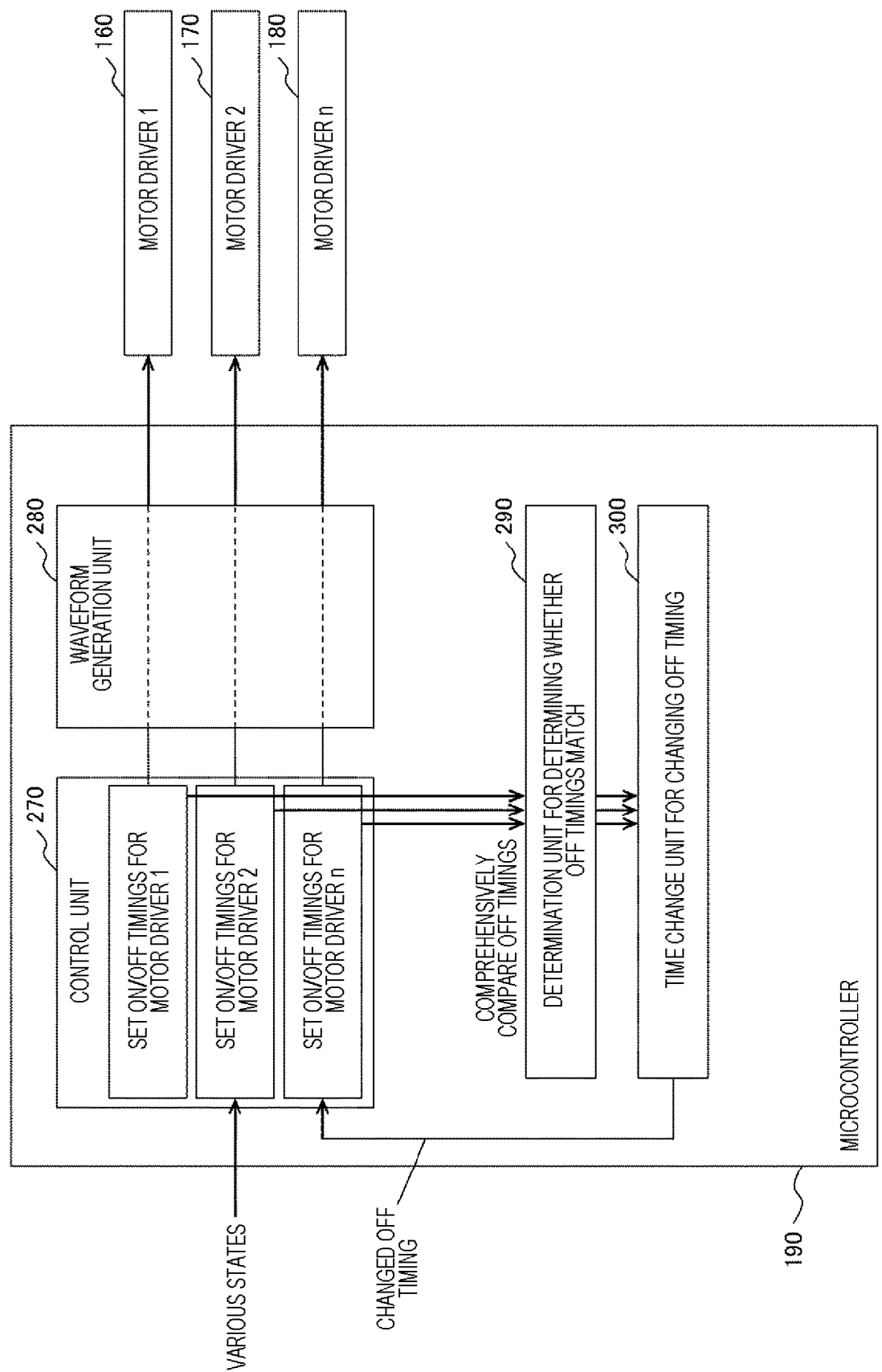
FIG. 3 is a functional block diagram of the in-vehicle control device of FIG. 1.

In the first embodiment, as illustrated in FIG. 3, the determination unit 290 comprehensively compares the OFF timings of the output voltages 240, 250, and 260 of the motor drivers based on the motor drive information included in the control unit 270, and the time change unit 300 changes the OFF timing for any of the motor drivers 160, 170, and 180 of which the OFF timings have been determined to match by the determination unit 290.

As compared with thereto, the present embodiment (FIG. 7) is an embodiment in which when the determination unit 290 comprehensively compares the OFF timings of the output voltages 240, 250, and 260, a threshold value of a motor driver current is set, and a motor driver through which a current equal to or smaller than the set threshold value flows is excluded from comparison targets.

As illustrated in FIG. 7, in the in-vehicle control device 110 according to the present embodiment, the microcontroller 190 includes a current threshold value comparison unit 310 that compares whether driver currents flowing through the motor drivers 160, 170, and 180 exceeds the set threshold value.

The set threshold value is determined, for example, from motor information or the like, which will be described later in the fourth embodiment (FIG. 10), and is stored in the storage element 330 such as a ROM.

In FIG. 7, since the driver current of the motor driver 1 (160) is equal to or smaller than the threshold value, the current threshold value comparison unit 310 excludes the motor driver 1 (160) from targets of which OFF timings are to be comprehensively compared by the determination unit 290. The other configurations are similar to those in FIG. 3, and detailed descriptions thereof will be omitted.

As described above, the in-vehicle control device 110 and the control method thereof according to the present embodiment is advantageous in that since the determination unit 290 excludes any of the motor drivers 160, 170, and 180 of which a driver current is equal to or smaller than the set threshold value from comparison targets, it is possible to reduce a processing load necessary for the microcontroller 190 as compared with that in the first embodiment.

Third Embodiment

Figure 8:
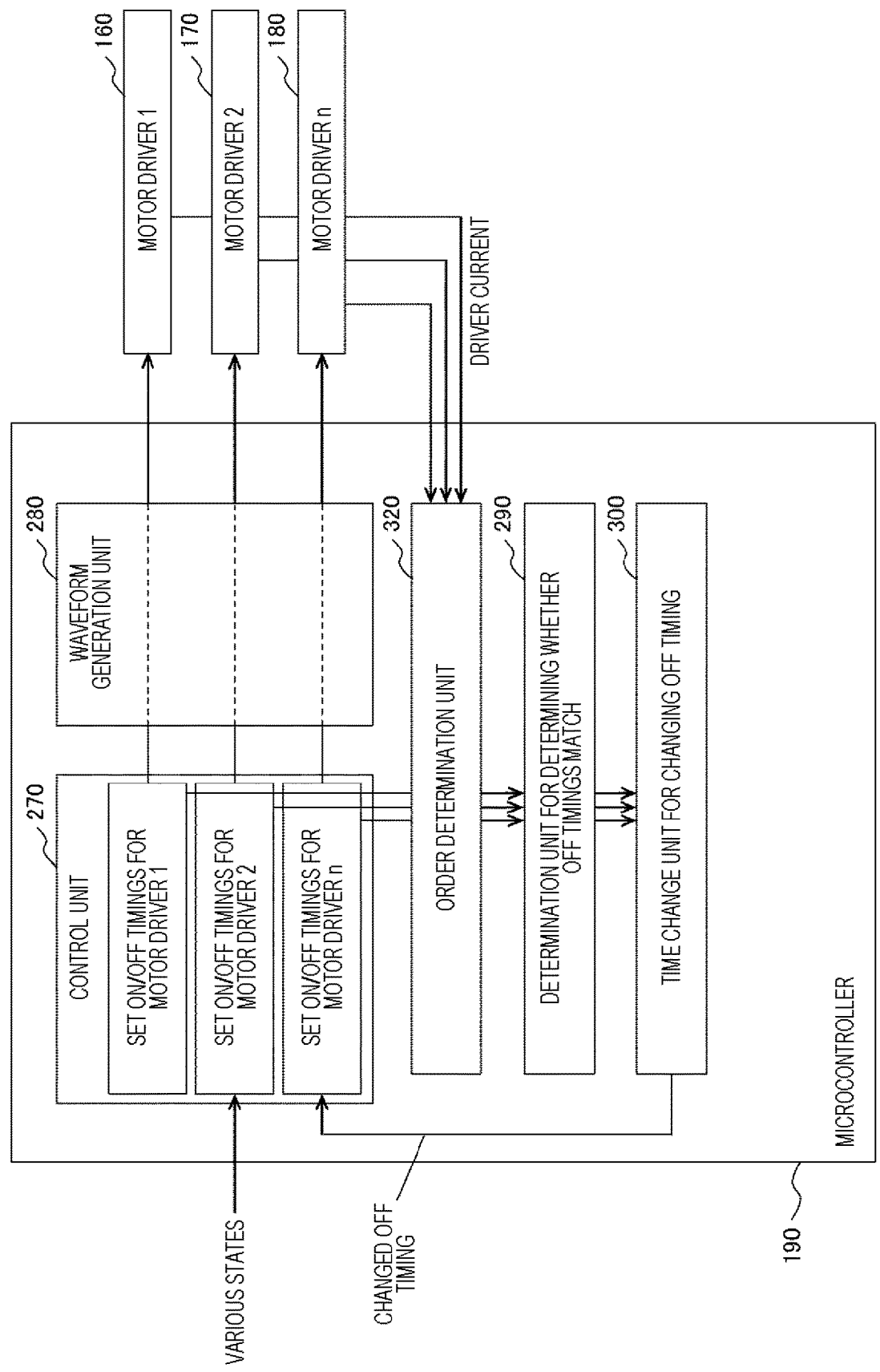
FIG. 8 is a functional block diagram of an in-vehicle control device according to a third embodiment of the present invention.
Figure 9:
FIG. 9 is a diagram illustrating an example in which priorities are determined in comparing OFF timings in the in-vehicle control device of FIG. 8.

An in-vehicle control device and a control method thereof according to a third embodiment of the present invention will be described with reference to FIGS. 8 and 9. FIG. 8 is a functional block diagram of an in-vehicle control device 110 according to the present embodiment, which is a modification of the first embodiment (FIG. 3). FIG. 9 is a diagram illustrating an example in which priorities are determined in comparing OFF timings in the in-vehicle control device 110 of FIG. 8.

In the present embodiment, the comparison order when the determination unit 290 compares the OFF timings of the output voltages 240, 250, and 260 is determined based on magnitudes of driver currents flowing through the motor drivers 160, 170, and 180. The other configurations are similar to those in the first embodiment (FIG. 3) and the second embodiment (FIG. 7).

As illustrated in FIG. 8, in the in-vehicle control device 110 according to the present embodiment, the microcontroller 190 includes an order determination unit 320 that determines an order of determination as to whether the OFF timings match based on the driver currents of the motor drivers 160, 170, and 180. The other configurations are similar to those in FIG. 3, and detailed descriptions thereof will be omitted.

The order determination unit 320 monitors driver currents of the motor drivers 160, 170, and 180, and determines comparison priorities in determining whether the OFF timings match.

As illustrated in FIG. 9, the order determination unit 320 monitors driver currents in addition the information on PWM driving frequencies and duty ratios obtained from the control unit 270, changes the comparison priorities in determining whether the OFF timings match in descending order of current value, and transmits the changed comparison priorities to the determination unit 290.

As described above, the in-vehicle control device 110 and the control method thereof according to the present embodiment is advantageous in that, by changing the comparison order when the determination unit 290 compares the OFF timings of the output voltages 240, 250, and 260 according to the magnitudes of the driver currents of the motor drivers 160, 170, and 180, it is possible to reduce the time required for the processing as compared with that in a case where the OFF timings are compared comprehensively as in the first embodiment.

Fourth Embodiment

Figure 10:
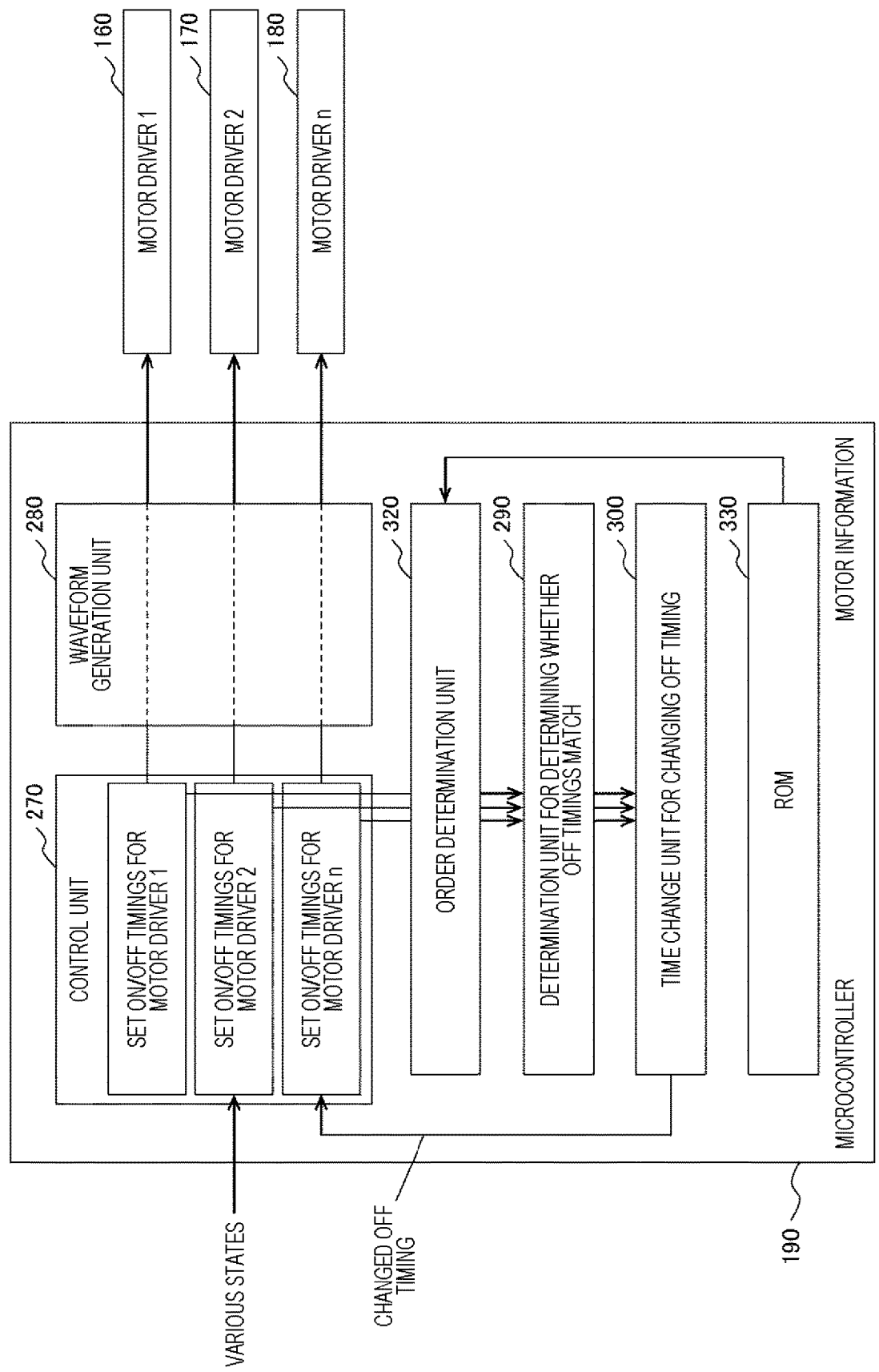
FIG. 10 is a functional block diagram of an in-vehicle control device according to a fourth embodiment of the present invention.
Figure 11:
FIG. 11 is a diagram illustrating an example in which priorities are determined in comparing OFF timings in the in-vehicle control device of FIG. 10.

An in-vehicle control device and a control method thereof according to a fourth embodiment of the present invention will be described with reference to FIGS. 10 and 11. FIG. 10 is a functional block diagram of an in-vehicle control device 110 according to the present embodiment, which is a modification of the third embodiment (FIG. 8). FIG. 11 is a diagram illustrating an example in which priorities are determined in comparing OFF timings in the in-vehicle control device 110 of FIG. 10.

In the present embodiment, the comparison order when the determination unit 290 compares the OFF timings of the output voltages 240, 250, and 260 is determined based on motor information stored in the storage element 330, such as a ROM, of the microcontroller 190. The other configurations are similar to those in the first embodiment (FIG. 3), the second embodiment (FIG. 7), and the third embodiment (FIG. 8).

As illustrated in FIG. 10, in the in-vehicle control device 110 according to the present embodiment, the microcontroller 190 includes a storage element 330 such as a ROM that stores motor information. The other configurations are similar to those in FIG. 8, and detailed descriptions thereof will be omitted.

The order determination unit 320 determines comparison priorities in determining whether the OFF timings match from the motor information stored in the ROM 330.

As illustrated in FIG. 11, the order determination unit 320 reads the motor information such as resistance values and inductance values of the motors from the ROM 330 in addition to the information on the PWM driving frequencies and the duty ratios obtained from the control unit 270, changes the comparison order in determining whether the OFF timings match in descending order of priority, and transmits the changed comparison order to the determination unit 290.

As described above, the in-vehicle control device 110 and the control method thereof according to the present embodiment is advantageous in that, by changing the comparison order when the determination unit 290 compares the OFF timings of the output voltages 240, 250, and 260 based on the motor information stored in the storage element 330, such as the ROM, of the microcontroller 190, it is possible to further reduce the time required for the processing as compared with that in a case where the current values are monitored as in the third embodiment.

Fifth Embodiment

An in-vehicle control device and a control method thereof according to a fifth embodiment of the present invention will be described with reference to FIG. 12. FIG. 12 is a functional block diagram of an in-vehicle control device 110 according to the present embodiment, which is a modification of the first embodiment (FIG. 3).

In the present embodiment, change amounts of the OFF timings when the OFF timings of the output voltages 240, 250, and 260 of the motor drivers match are determined by a method using the motor information as a parameter. The other configurations are similar to those in the first to fourth embodiments.

As illustrated in FIG. 12, in the in-vehicle control device 110 according to the present embodiment, the microcontroller 190 includes a storage element 330 such as a ROM that stores motor information, and a shift amount determination unit 340 that determines change amounts of the OFF timings of the output voltages 240, 250, and 260 of the motor drivers. The other configurations are similar to those in FIG. 3, and detailed descriptions thereof will be omitted.

In the present embodiment, when the time change unit 300 shifts the OFF timings of the motor drivers 160, 170, and 180, the shift amount determination unit 340 determines shift amounts based on motor control information such as duty resolutions stored in the storage element 330 such as a ROM. The shift amounts are determined based on various kinds of information grasped by microcontroller 190 within a range that does not conflict with the motor control initially set by control unit 270.

The in-vehicle control device 110 and the control method thereof according to the present embodiment is advantageous in that, by shifting the OFF timings of the output voltages 240, 250, and 260 of the motor drivers, it is possible to minimize the influence on the control of the external motors 130, 140, and 150.

Sixth Embodiment

Figure 13:
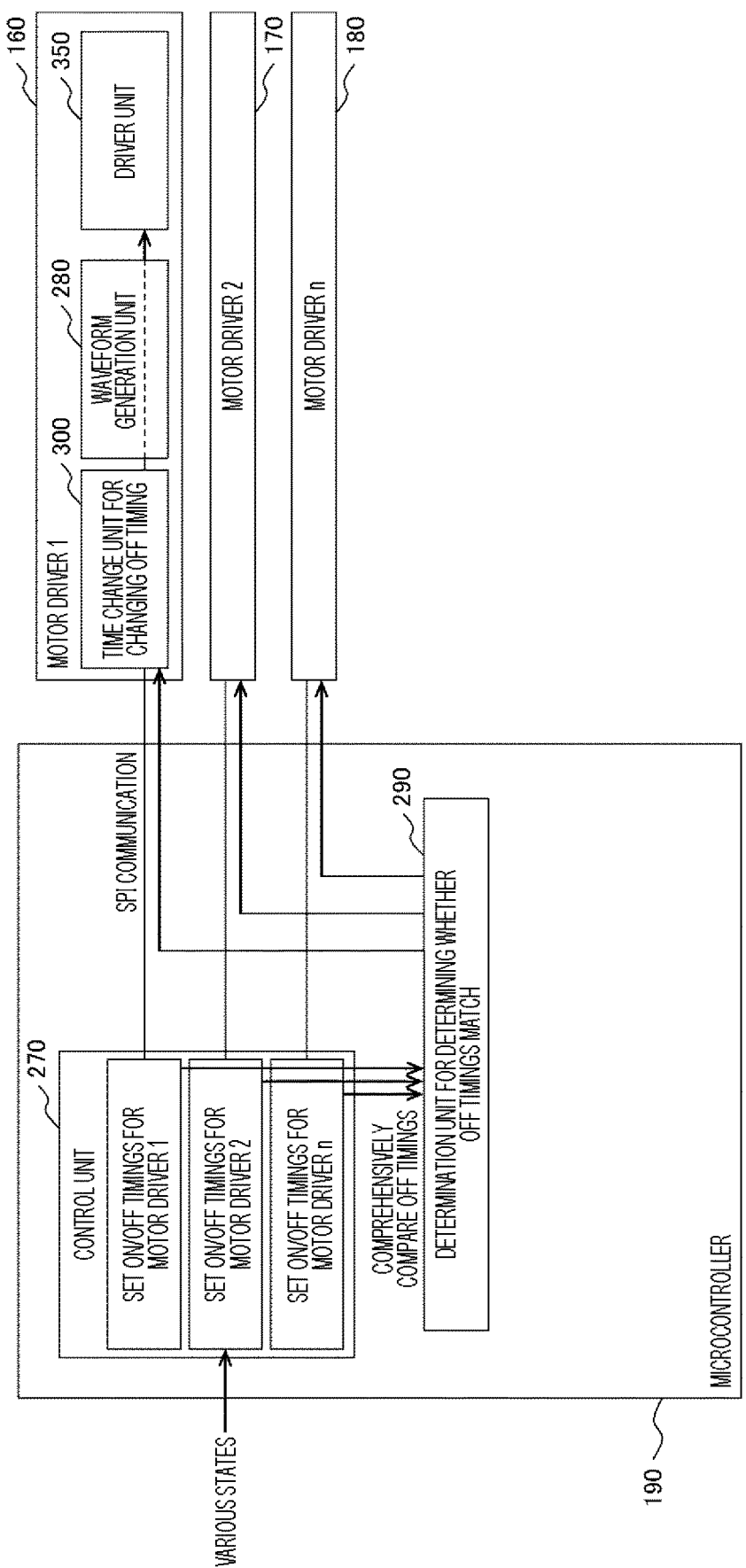
FIG. 13 is a functional block diagram of an in-vehicle control device according to a sixth embodiment of the present invention.

An in-vehicle control device and a control method thereof according to a sixth embodiment of the present invention will be described with reference to FIG. 13. FIG. 13 is a functional block diagram of an in-vehicle control device 110 according to the present embodiment, which is a modification of the first embodiment (FIG. 3).

As illustrated in FIG. 13, in the in-vehicle control device 110 according to the present embodiment, the microcontroller 190 does not include a time change unit 300 and the waveform generation unit 280, and each of the motor drivers 160, 170, and 180 includes a time change unit 300 and a waveform generation unit 280. The other configurations are similar to those in the first to fifth embodiments.

The microcontroller 190 transmits the motor drive information set by the control unit 270 and the determination result of the determination unit 290 as to whether the OFF timings match to the motor drivers 160, 170, and 180 through communication such as serial peripheral interface (SPI) communication.

Based on the motor drive information: input from the microcontroller 190 and the determination result the determination unit 290 as to whether the OFF timings match, the time change unit 300 changes the OFF timings, and the waveform generation unit 280 generates PWM waveforms. The generated PWM waveforms are sent to the driver unit 350 including switching elements (switching elements 200, 210, 220, and 230 in the motor driver 160).

As described above, the in-vehicle control device 110 and the control method thereof according to the present embodiment is advantageous in that even when the waveform generation unit 280 is provided in each of the motor drivers 160, 170, and 180 in order to suppress the processing load of the microcontroller 190, the time change unit 300 is provided in each of the motor drivers 160, 170, and 180, thereby obtaining the same effect as that of the first embodiment.

Note that, although the electronic control unit (ECU) 110 is described in each of the first to sixth embodiments, the present invention is not limited to the ECU 110, and the effect of the present invention can be obtained even when the present invention is applied to an in-vehicle control device having a similar circuit configuration for driving an in-vehicle load.

In addition, the present invention is not limited to the above-described embodiments, and includes various modifications thereof. For example, the above-described embodiments have been described in detail in order to explain the present invention in an easy-to-understand manner, and are not necessarily limited to having all the configurations described above. In addition, a part of the configuration of one embodiment may be replaced with the configuration of another embodiment, and the configuration of one embodiment may be added to the configuration of another embodiment. In addition, with respect to a part of the configuration of each embodiment, it is possible to perform addition or deletion of another configuration, or replacement with another configuration.

REFERENCE SIGNS LIST

100 power supply
110 in-vehicle control device (ECU)
120 electronic component (electrolytic capacitor)
130 external motor 1
140 external motor 2
150 external motor n
160 motor driver 1
170 motor driver 2
180 motor driver n
190 integrated circuit device (microcontroller)
200 switching element 1
210 switching element 2
220 switching element 3
230 switching element 4
240 output voltage 1 of motor driver
250 output voltage 2 of motor driver
260 output voltage n of motor driver
270 control unit
280 waveform generation unit
290 determination unit
300 time change unit
310 current threshold value comparison unit
320 order determination unit
330 storage element (ROM)
340 shift amount determination unit
350 driver unit

The invention claimed is:

1. An in-vehicle control device comprising:
   a plurality of load drive circuits;
   a microcontroller that transmits control signals to the plurality of load drive circuits;
   a determination unit that determines whether OFF timings of the control signals transmitted to the plurality of load drive circuits, respectively, match;
   a time change unit that changes the OFF timings based on a determination result of the determination unit, so that the OFF timings do not match;
   a control unit that sets load drive information from drive states of loads and corrects the set load drive information based on a change result of the time change unit; and
   a waveform generation unit that generates control signals to be transmitted to the plurality of load drive circuits based on the load drive information corrected by the control unit.

2. The in-vehicle control device according to claim 1, wherein the determination unit determines that the OFF timings match, when fall transient response times of the plurality of load drive circuits overlap each other.

3. The in-vehicle control device according to claim 1, wherein the determination unit comprehensively compares all of the OFF timings of the load drive circuits so that the OFF timings of the plurality of load drive circuits do not match.

4. The in-vehicle control device according to claim 3, further comprising a current threshold value comparison unit that compares a value of a current flowing through each of the plurality of load drive circuits with a predetermined threshold value, wherein a load drive circuit of which a current flowing therethrough is determined by the current threshold value comparison unit to be equal to or smaller than the predetermined threshold value is excluded from targets to be compared by the determination unit.

5. The in-vehicle control device according to claim 3, further comprising an order determination unit that determines an order of determination as to whether the OFF timings match based on magnitudes of output currents of the plurality of load drive circuits.

6. The in-vehicle control device according to claim 3, further comprising an order determination unit that determines an order of determination as to whether the OFF timings match based on load information stored in advance in a storage element.

7. The in-vehicle control device according to claim 3, further comprising a shift amount determination unit that determines change amounts of the OFF timings based on load information stored in advance in a storage element.

8. The in-vehicle control device according to claim 7, wherein the shift amount determination unit determines the change amounts of the OFF timings within a range that does not affect load control performed according to the load drive information initially set by the control unit.

9. The in-vehicle control device according to claim 1, wherein
the microcontroller includes the determination unit and the control unit,
each of the plurality of load drive circuits includes the time change unit and the waveform generation unit, and
the plurality of load drive circuits correct the respective control signals based on a determination result of the determination unit received from the microcontroller.

10. A control method for an in-vehicle control device, the method comprising the steps of:
(a) acquiring information on drive states of a plurality of loads connected to each other;
(b) setting load drive information including ON/OFF timings of a plurality of load drive circuits for driving the plurality of loads, respectively, based on the information acquired in the step (a);
(c) comparing OFF timings of the plurality of load drive circuits from output voltages of the plurality of load drive circuits, and determining whether the OFF timings match;
(d) when it is determined in the step (c) that the OFF timings of the plurality of load drive circuits match, changing the OFF timing for any of the plurality of load drive circuits, and correcting the load drive information based on the changed OFF timing; and
(e) generating control signals to be transmitted to the plurality of load drive circuits based on the load drive information corrected in the step (d).

11. The control method for an in-vehicle control device according to claim 10, wherein, in the step (c), it is determined that the OFF timings match, when fall transient response times of the plurality of load drive circuits overlap each other.

12. The control method for an in-vehicle control device according to claim 10, wherein, in the step (c), all of the OFF timings of the load drive circuits are comprehensively compared so that the OFF timings of the plurality of load drive circuits do not match.

13. The control method for an in-vehicle control device according to claim 12, wherein, in the step (c), a value of a current flowing through each of the plurality of load drive circuits is compared with a predetermined threshold value, and a load drive circuit of which a current flowing therethrough is determined to be equal to or smaller than the predetermined threshold value is excluded from comparison targets.

14. The control method for an in-vehicle control device according to claim 12, wherein, in the step (c), an order of determination as to whether the OFF timings match is determined based on magnitudes of output currents of the plurality of load drive circuits.

15. The control method for an in-vehicle control device according to claim 12, wherein, in the step (c), an order of determination as to whether the OFF timings match is determined based on load information stored in advance in a storage element.

* * * * *